Figure 1:
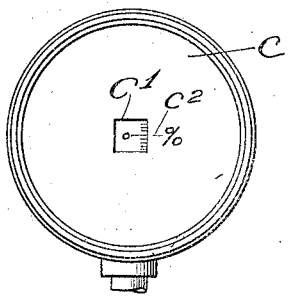

J. K. STEWART.
GRADE METER.
APPLICATION FILED JAN. 27, 1913.

1,083,639.

Patented Jan. 6, 1914.

Witnesses:

Inventor:
John K. Stewart
by Burton Burton
his attys

_UNITED STATES PATENT OFFICE._

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

GRADE-METER.

1,083,639.   Specification of Letters Patent.   Patented Jan. 6, 1914.

Application filed January 27, 1913. Serial No. 744,342.

*To all whom it may concern:*

Be it known that I, JOHN K. STEWART, a citizen of the United States, residing at Chicago, in the county of Cook and State of Illinois, have invented new and useful Improvements in Grade-Meters, of which the following is a specification, reference being had to the accompanying drawings, forming a part thereof.

The purpose of this invention is to provide an improved form of grade meter particularly designed with a view to rendering the indicating means substantially "dead beat" in operation and not subject to influences or forces other than change of inclination.

It consists of the features and elements described and shown in the drawings as indicated by the claims.

Figure 2:
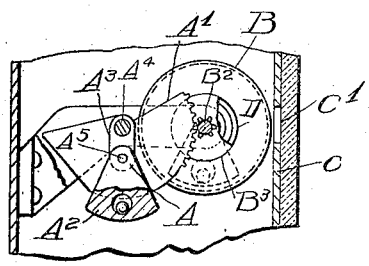
Figure 3:
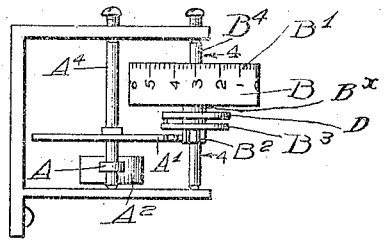
Figure 4:
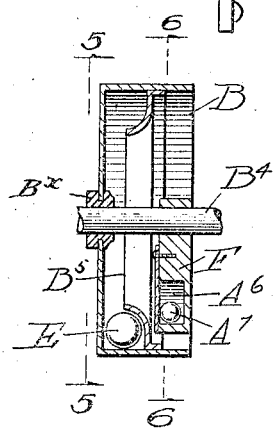
Figure 5:
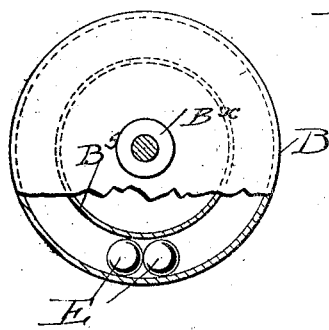
Figure 6:
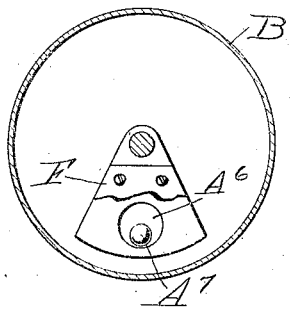

In the drawings:—Figure 1 is a face view of an instrument embodying this invention. Fig. 2 is an interior detail view partly in section showing the mechanism which is responsive to change of grade and the indicating means connected thereto. Fig. 3 is a top plan view of the parts shown in Fig. 2. Fig. 4 is a detail section taken as indicated at line 4—4 on Fig. 3. Fig. 5 is a detail section taken as indicated at line 5—5 on Fig. 4. Fig. 6 is a section taken as indicated at line 6—6 on Fig. 4.

The grade meter which is the subject of this invention comprises essentially a pendulum, A, operatively connected with a segmental gear, $A^1$, and an indicating dial wheel, B, whose peripheral scale, $B^1$, is arranged to appear at the window, $C^1$, of the casing, C, and which is actuated through a pinion, $B^2$, meshing with the segmental gear, $A^1$. Obviously, if the scale, $B^1$, is correctly proportioned, its position with respect to a fixed line such as the index, $C^2$, on the face of the casing will indicate the inclination of the vehicle on which the instrument is mounted with respect to the constantly vertical position of the pendulum, A. However, on account of the weight of the pendulum, A, the rapid acceleration or retardation of the vehicle in starting or stopping quickly is likely to overcome the inertia of the pendulum and thus to move the scale of the grade meter even on level ground, rendering its indications more or less uncertain and unreliable. To prevent this effect as far as possible, the pendulum, A, may be jointed as shown in Fig. 2 so as to comprise a secondary pendulum, $A^2$, pivotally hung upon a stirrup member, $A^3$, which is rigidly connected with the fulcrum shaft, $A^4$, of the pendulum, A. Thus the sudden starting or stopping of the vehicle will tend merely to swing the part, $A^2$, about the pivot, $A^5$, by which it is connected to the stirrup member, $A^3$, and will not affect the position of the shaft, $A^4$, to which said stirrup is secured and which also carries rigidly the gear segment, $A^1$, for operating the dial wheel, B. When the inclination of the vehicle is actually changed, however, the constant pull of gravity upon the jointed pendulum, A, will tend to straighten out its joint and thus rotate the shaft, $A^4$, through the proper angle for indicating the actual grade. As a further precaution, however, the pinion, $B^2$, may be connected with the dial wheel, B, through a yielding spring connection as indicated in Figs. 2 and 3, which show a spiral spring, D, similar to the hair spring of a watch, and having one end connected to a flange, $B^3$, of the pinion, $B^2$, and the other end secured to the hub $B^x$ of the dial wheel, B, said hub serving to connect the dial wheel rigidly with the spindle, $B^4$. It will be understood of course that with this arrangement the pinion, $B^2$, is mounted loosely upon the spindle, $B^4$, of the dial wheel, B. Particularly when this spring connection is employed between the pinion, $B^2$, and the dial wheel, B, the latter being thus yieldingly connected to the pendulum, A, is somewhat likely to be carried past the true reading by a rather sudden change of grade of the vehicle, so that even though the pendulum itself is practically "dead beat" the scale still may not be, and may vibrate to either side of the correct scale reading before coming to rest thereat, in the manner of a sensitive galvanometer or other delicate measuring instrument. This tendency, however, may be overcome to some extent by placing the hollow shell which constitutes the wheel, B, with two or more steel balls, E, whose friction against each other and against the inner wall of the shell, B, will tend to reduce the excess motion of the shell and cause the wheel, B, to come to rest very nearly at the correct scale reading. In addition to this, if desired, a pendulum, F, may be hung loosely upon the spindle, $B^4$, so that its journal friction thereon will assist in the retarding of the wheel, B.

Fig. 4, indicates how the balls, E, are prevented from interfering with the action of the pendulum, F, namely, by the insertion of a partition flange, $B^5$, in the shell. Analyzing the action of the pendulum, F, it will be seen that if a sudden shock or acceleration experienced by the vehicle should cause the stirrup portion, $A^3$, of the pendulum, A, to swing about its fulcrum axis and thus actuate the gear segment, $A^1$, and the dial wheel, B, through the pinion, $B^2$, the rotation of the dial wheel, B, thus caused would be in the opposite direction of that of the pendulum, A, by virtue of the gearing between said elements, while the swing of the pendulum, F, would be in the same direction as that of the pendulum, A, and would thus directly tend to frictionally counteract the latter. If the two pendulums, A and F, be made of exactly equal effective lengths so as to have equal periods of vibration, it is obvious that they will continue to counteract each other as long as they vibrate. But, since the primary purpose of each of the pendulums, A and F, and particularly of the pendulum, A, is not that of a vibrating pendulum but that of a plumb bob merely, the tendency to pendulous vibration may be reduced in one or both of them by providing a chamber as at, $A^6$, (see Fig. 6), and furnishing said chamber with a small steel ball, $A^7$, whose induced motion within the chamber will not be in harmony with the periodic movement of the pendulum and will thus tend to damp its swing and bring it to rest more promptly.

I claim:—

1. In a grade meter comprising a pendulum, an indicating member and means operatively connecting them, said indicating member comprising a cylindrical shell and a plurality of balls loosely carried in said shell for frictionally absorbing excessive vibration of the pendulum.

2. In a grade meter comprising a pendulum, an indicating member and means operatively connecting them, said indicating member having a shaft to which it is rigidly secured, and a second pendulum journaled upon said shaft for frictionally absorbing excessive vibration of the indicating member.

3. In a grade meter comprising a pendulum, a gear operatively connected therewith, a rotatably mounted indicating member and a driving pinion therefor meshing with the gear of the pendulum, said indicating member having a shaft to which it is rigidly secured; a second pendulum journaled upon said shaft for frictionally neutralizing excessive vibration of the first pendulum.

4. In a grade meter comprising a pendulum, an indicating member, means whereby the member is operatively connected with the pendulum, said pendulum having a chamber and a ball loosely fitted in the chamber for damping the vibration of the pendulum.

5. In a grade meter comprising a pendulum, an indicating member consisting of a hollow dial wheel and means operatively connecting them, including a yielding and elastic connection for absorbing vibration of the pendulum; a plurality of balls loosely carried in said hollow wheel for frictionally damping the rotation of said wheel.

6. In a grade meter comprising a pendulum, an indicating member consisting of a hollow dial wheel and means operatively connecting them, including a yielding and elastic connection for absorbing vibration of the pendulum, said wheel having a shaft to which it is rigidly secured; a second pendulum journaled upon said shaft for frictionally damping the rotation of said wheel.

In testimony whereof, I have hereunto set my hand, at Chicago, Illinois, this 30th day of September, 1912.

JOHN K. STEWART.

Witnesses:
 C. B. SMITH,
 STANHOPE HUDSON.